US008198744B2

(12) United States Patent
Kern et al.

(10) Patent No.: US 8,198,744 B2

(45) Date of Patent: Jun. 12, 2012

(54) INTEGRATED BOOST CAVITY RING GENERATOR FOR TURBOFAN AND TURBOSHAFT ENGINES

(75) Inventors: John M. Kern, Rexford, NY (US); Ronghai Qu, Clifton Park, NY (US); Craig Douglas Young, Maineville, OH (US)

(73) Assignee: General Electric Company, Schenectady, NY (US)

( * ) Notice: Subject to any disclaimer, the term of this patent is extended or adjusted under 35 U.S.C. 154(b) by 938 days.

(21) Appl. No.: 11/614,269

(22) Filed: Dec. 21, 2006

(65) Prior Publication Data

US 2008/0150287 A1 Jun. 26, 2008

(51) Int. Cl.
*H02P 9/00* (2006.01)

(52) U.S. Cl. .......................................... 290/52; 290/1 A

(58) Field of Classification Search .................... 322/28; 290/52, 1 R, 1 A, 2, 3, 32, 30 R; 60/39.53
See application file for complete search history.

(56) References Cited

U.S. PATENT DOCUMENTS

| | | | | |
|---|---|---|---|---|
| 3,452,225 | A | 6/1969 | Gourdine | |
| 3,471,727 | A | 10/1969 | Sedlock et al. | |
| 3,629,632 | A | 12/1971 | Loupe | |
| 4,362,020 | A | 12/1982 | Meacher et al. | |
| 5,214,333 | A | 5/1993 | Kawamura | |
| 5,341,060 | A | 8/1994 | Kawamura | |
| 5,694,765 | A | 12/1997 | Hield et al. | |
| 5,760,507 | A | 6/1998 | Miller et al. | |
| 5,783,894 | A | 7/1998 | Wither | |
| 5,881,559 | A | 3/1999 | Kawamura | |
| 6,145,314 | A | 11/2000 | Woollenweber et al. | |
| 6,355,987 | B1 * | 3/2002 | Bixel | 290/52 |
| 6,434,936 | B1 | 8/2002 | Singh | |
| 6,467,725 | B1 * | 10/2002 | Coles et al. | 244/58 |
| 6,553,153 | B1 * | 4/2003 | Cui | 382/298 |

(Continued)

FOREIGN PATENT DOCUMENTS

RU 2142565 C1 10/1999

OTHER PUBLICATIONS

Qu et al. "Dual-Rotor, Radial Flux, Toroidally Wound, Permanent-Magnet Machines" IEEE Transactions on Industry Applications, vol. 39, No. 6, Nov./Dec. 2003; Copyright 2003, IEEE, pp. 1665-1673.

*Primary Examiner* — Nicholas Ponomarenko

(74) *Attorney, Agent, or Firm* — McNees Wallace & Nurick LLC

(57) ABSTRACT

An electrical generator for extraction of electrical power from a gas turbine engine includes a rotor portion and a stator portion disposed within a booster cavity of the gas turbine engine. The rotor portion is rotatably supported about the stator portion. The stator portion rigidly is supported within the booster cavity. The rotor portion has a plurality of poles circumferentially arranged opposite the stator portion. The stator portion includes a plurality of coil portions disposed about an outer periphery of the stator portion adjacent to the stator portion. The stator and rotor portions are configured to generate electrical power when the rotor portion is rotated about the stator portion by a shaft of the gas turbine engine to induce electrical currents in the coil portions. The electrical generator extracts electric power from the turbine engine to supplement primary electrical generation sources of the engine.

18 Claims, 2 Drawing Sheets

U.S. PATENT DOCUMENTS

| | | | | |
|---|---|---|---|---|
| 6,553,753 | B1 * | 4/2003 | Payling et al. | 60/39.53 |
| 6,553,764 | B1 | 4/2003 | Gladden et al. | |
| 6,713,892 | B2 * | 3/2004 | Gilbreth et al. | 290/52 |
| 6,787,933 | B2 * | 9/2004 | Claude et al. | 290/52 |
| 6,789,000 | B1 | 9/2004 | Munson, Jr. | |
| 6,895,741 | B2 | 5/2005 | Rago et al. | |
| 6,914,344 | B2 | 7/2005 | Franchet et al. | |
| 6,924,574 | B2 | 8/2005 | Qu et al. | |
| 6,990,797 | B2 * | 1/2006 | Venkataramani et al. | 60/204 |
| 7,514,810 | B2 * | 4/2009 | Kern et al. | 290/52 |
| 2005/0162030 | A1 | 7/2005 | Shah et al. | |

* cited by examiner

INTEGRATED BOOST CAVITY RING GENERATOR FOR TURBOFAN AND TURBOSHAFT ENGINES

FIELD OF THE INVENTION

The present invention is directed to a system for generating electrical power from turbofan and turboshaft engines, and more particularly to an electrical generator integrally disposed within the boost cavity of a turbofan aircraft engine.

BACKGROUND OF THE INVENTION

A gas turbine engine generally includes one or more compressors followed in the flow direction by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

Various types of turbofan engines contain a booster section disposed upstream of the compressors. The booster section typically includes a large, annular cavity. The engine power is transferred either as shaft power or thrust for powering an aircraft in flight. For example, in other rotatable loads, such as a fan rotor in a by-pass turbofan engine, or propellers in a gas turbine propeller engine, power is extracted from the high and low pressure turbines for driving the respective fan rotor and the propellers.

It is well understood that individual components of turbofan engines, in operation, require different power parameters. For example, the fan rotational speed is limited to a degree by the tip velocity and, since the fan diameter is very large, rotational speed must be very low. The core compressor, on the other hand, because of its much smaller tip diameter, can be driven at a higher rotational speed. Therefore, separate high pressure and low pressure turbines with independent power transmitting devices are necessary for the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than to rely solely on the HP engine spool to drive the electrical generators. The low-pressure (LP) engine spool provides an alternate source of power transfer, however, the relatively lower speed of the LP engine spool typically requires the use of a gearbox, as slow-speed electrical generators are often larger than similarly rated electrical generators operating at higher speeds. The boost cavity of gas turbine engines has available space that is capable of housing an inside out electric generator, however, the boost section rotates at the speed of the LP engine spool.

Also, it is difficult to allocate additional space inside the gas turbine engine in which to place components such as generators, because most of the available space inside the nacelle is utilized.

Use of machines operable as either generators or motors for shaft power transfer in gas turbine engines is known in the art. Hield et al. in their U.S. Pat. No. 5,694,765 which issued Dec. 9, 1997, describe a multi-spool gas turbine engine for an aircraft application, which includes a transmission system operated to transfer power between relatively rotatable engine spools. In a number of embodiments, each shaft is associated with a flow displacement machine operable as a pump or a motor, and in other embodiments, permanent magnet or electromagnetic induction type machines operable as motors or generators, are drivingly connected via an auxiliary gearbox to a flow-driven gearbox. However, Hield et al. shaft power transfer system does not disclose differential geared gas turbine engines, because they direct themselves to the transfer of shaft power between two independently rotatable (i.e. not differentially-geared) engine spools.

Rago et al., in their U.S. Pat. No. 6,895,741, which issued May 24, 2005, describe a differentially-geared gas turbine engine with motor/generator regulating mechanisms. Rotatable loads are driven by differential gearing operatively coupled with the turbine, and power transfer is controlled with machines operable as a generator or motor for selectively taking power from one of the rotatable loads to drive the other of the rotatable loads. The differential gearing system comprises a sun gear affixed to the forward end of the turbine rotating shaft, and planet gearing engaging the sun gear operatively connected to the compressor for rotationally driving the compressor at a first output rotational speed with respect to the turbine. A planet carrier is provided for operatively supporting the planet gearing and is rotatable together with the planet gearing. The planet carrier is operatively connected to the rotatable load for driving the rotatable load in a rotational motion at a second output rotational speed with respect to the turbine. The first and second motor/generator mechanisms are preferably permanent magnet motor/generators.

Therefore, there is a need for an electrical generator integrated within the boost cavity of a gas turbine engine with a high rotational speed and that does not obstruct airflow within the engine.

SUMMARY OF THE INVENTION

The present invention discloses a device for extracting electrical power from turbofan engines and turboshaft engines. An electrical generator, preferably an "inside-out" electromagnetic generator architecture, is located within the booster cavity. An "inside out" electrical generator is an electrical generator that includes an outer rotor section that rotates around an inner stator section to generate electric power. The "inside out" arrangement of the generator is the reverse of the conventional electric generator, in which the rotor section rotates inside of the stator section.

In one aspect, the invention is directed to an electrical generator for extraction of electrical power from a gas turbine engine. The electrical generator includes a rotor portion and a stator portion disposed within a booster cavity of the gas turbine engine. The rotor portion is rotatably supported about the stator portion. The stator portion rigidly is supported within the booster cavity. The rotor portion has a plurality of poles circumferentially arranged opposite the stator portion. The stator portion includes a plurality of coil portions disposed about an outer periphery of the stator portion adjacent to the stator portion. The stator and rotor portions are configured to generate electrical power when the rotor portion is rotated about the stator portion by a shaft of the gas turbine engine to induce electrical currents in the coil portions.

In another aspect, the present invention is directed to an electrical generator for extraction of electrical power from a gas turbine engine including a rotor portion and a stator portion. The rotor portion and stator portion are disposed within a booster cavity of the gas turbine engine, and arranged concentrically within the booster cavity. The rotor portion includes a plurality of poles arranged circumferentially opposite the stator portion. The stator portion includes a plurality of coil portions adjacent to the stator portion. The stator and rotor portions are configured to generate electrical power when one of the rotor portion and the stator portion is rotated relative to the other by a shaft of the gas turbine engine to induce electrical currents in the coil portions.

In yet another aspect, the present invention is directed to a gas turbine engine including at least one compressor, a combustor, a high pressure turbine and a low pressure turbines arranged in serial flow communication and disposed about a longitudinal shaft of the engine within an annular outer casing. The at least one compressor is driven by the high pressure and low pressure turbines and compressor air during operation. A booster section is disposed upstream of the compressors and driven by a shaft connected to the low pressure turbine. The booster section also includes an annular cavity. An electrical generator is disposed within the annular cavity. The electrical generator includes a rotor portion and a stator portion, the rotor portion and the stator portion arranged concentrically within the annular cavity. The rotor portion includes a plurality of poles arranged circumferentially opposite the stator portion. The stator portion includes a plurality of coil portions adjacent to the stator portion. The rotor portion is supported within the annular cavity and rotatable relative to the stator portion, the stator portion being rigidly supported within the annular cavity. The stator and rotor portions are configured to generate electrical power when one of the rotor portion and the stator portion is rotated relative to the other by a shaft of the low pressure turbine to induce electrical currents in the coil portions.

The present invention provides greater power extraction capacity from a turbofan or turboshaft engine than existing turbofan or turboshaft engines provide.

The present invention provides the ability to control power extraction from the engine while minimizing the performance impact on the engine.

The present invention has the ability to integrate the electrical generator into the design of the engine symmetrically about the driveshaft, such that it does not obstruct the engine flow paths.

The present invention provides the placement of the electrical generator to exploit otherwise unused space in the engine.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
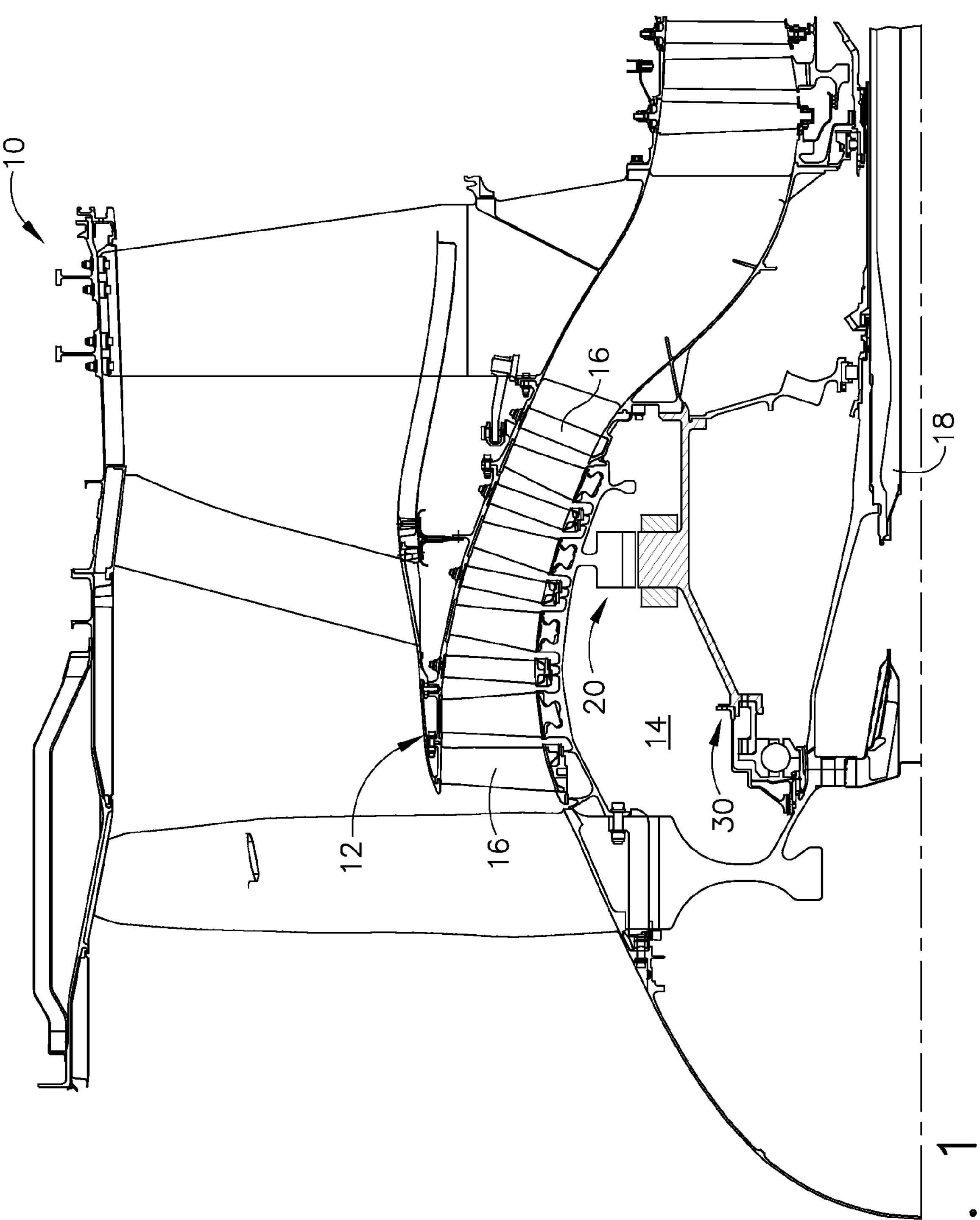
FIG. 1 is a partial cross-sectional view of a boost cavity portion of a gas turboshaft engine.
Figure 2:
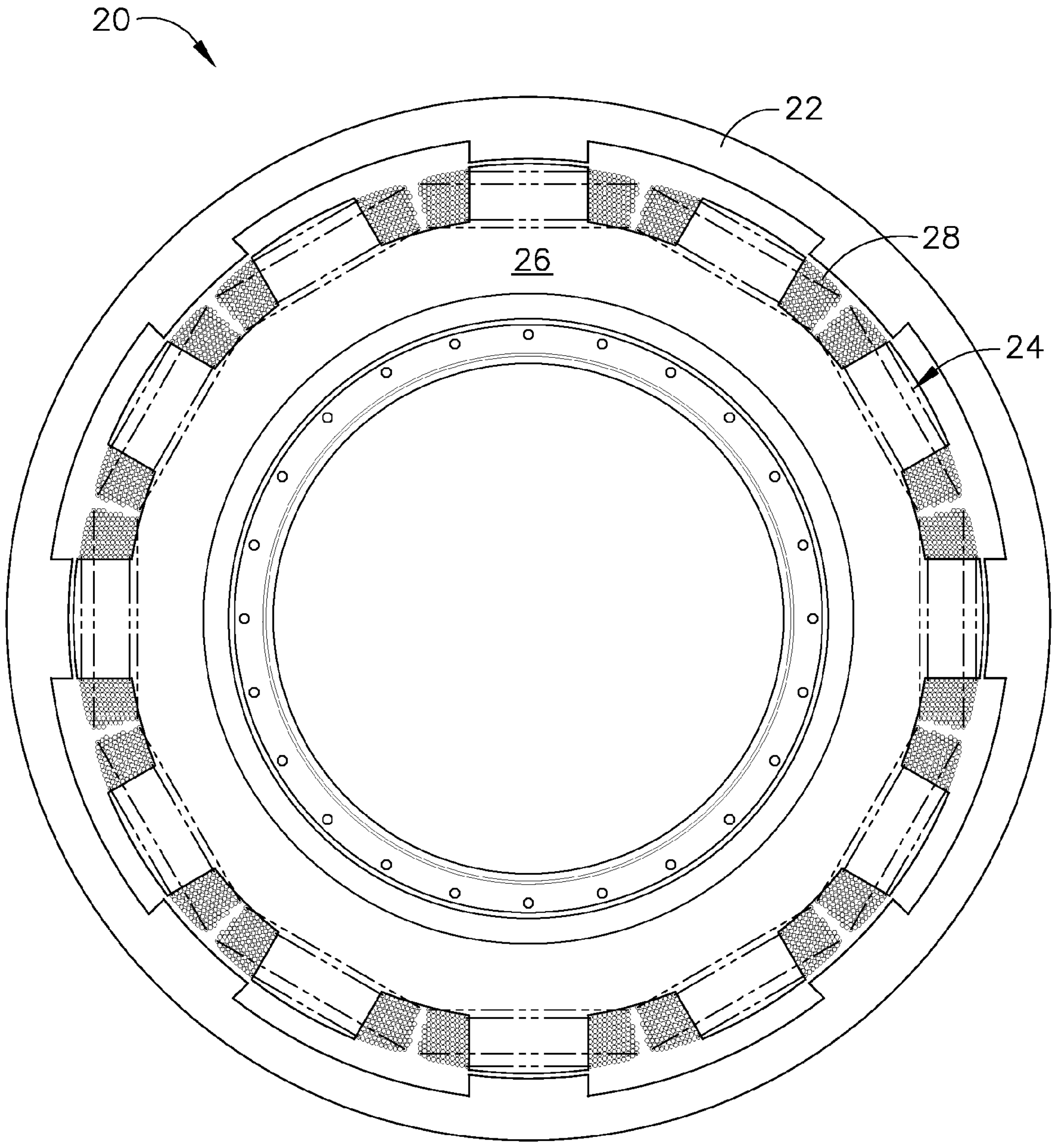
FIG. 2 is a schematic diagram of the ring generator.

Referring to FIGS. 1 and 2, there is a turbine engine generally designated as 10. A booster section 12 includes a cavity 14 between the booster section blades 16 and the axial shaft of the engine 10. An electrical generator 20 is mounted inside the cavity 14 and extracts electrical power from the engine 10. The generator 20 is preferably a switched reluctance (SR) machine, although the invention is not limited to SR machines, as induction machines and other types of electromagnetic machines, as well as permanent magnet machines, may also be used. An inside out switched reluctance is a preferred electromagnetic machine for application in the present invention, since the rotor section of an inside out switched reluctance machine does not require cooling or field windings. While the following description is directed to an SR machine configuration, it will be understood by those skilled in the art that various electromagnetic machine configurations may be substituted for the SR machine to achieve the same purpose.

Preferably the electrical generator 20 employs an "inside-out" architecture. The "inside out" architecture refers to an arrangement that is the reverse of the conventional generator configuration. The term "inside out" architecture describes a rotor section that is positioned on the outer perimeter and rotates about an internal, fixed stator section to generate electric power.

Referring next to FIG. 2, the generator 20 includes a stator portion 24 and a rotor portion 22 that is integrated within the booster cavity 14. The stator portion 24 includes a plurality of stator cores 26 and stator coils 28. Each stator coil 28 is wrapped around, or otherwise attached to a stator core 26. The stator portion 24 is an annular structure arranged concentrically within the rotor in a fixed or stationary position, and supported by brackets 30. The stator may also include cooling means (not shown), e.g. oil conduction cooling, oil spray cooling, or any other conventional means.

The electrical generator 20 provides a supplemental source of electrical power in addition to the traditional sources of electrical power in turbine engines, i.e., electrical generators driven by the HP turbine. The generator rotor section 22 is integrated into the inside diameter of the booster section 12. A variety of electromagnetic machines may be employed in the present invention.

The electrical generator 20 is arranged in a large, annular ring that encompasses internal components of the engine within the stator portion 24. The annular ring generator 20 has a high-aspect ratio of diameter to length (i.e., generator total axial length, including axial length of the iron core, end-windings, and other necessary items such as the generator frame), which is preferable due to the lower relative rotating speed of the LP spool driving the generator 20. The tip speed of the generator rotor portion is greater for the exterior rotor portion 22, and the resulting output power increases as the square of the diameter of the generator.

The inside out generator configuration is particularly suited to robust machine types such as switched reluctance and synchronous reluctance. The inside out generator may also be configured as a permanent magnet machine. The rotor section 22 is rotatably integrated into the inside diameter of the boost section 12, requiring greatly reduced cooling, windings, and commutation or slip rings.

The positioning of the "inside-out" generator in the boost cavity allows the extraction of power from the LP turbine spool, with minimal effect on the engine geometry, and minimal obstruction to air flow paths. The integral arrangement of the rotor section in the boost section permits the use of machines that require no rotor cooling or windings for normal operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electrical generator for extraction of electrical power from a gas turbine engine comprising:

a rotor portion and a stator portion disposed within a booster cavity of the gas turbine engine, the gas turbine engine comprising a first shaft driving a low pressure turbine and a second shaft driving a high pressure turbine, the first and second shafts independently rotatable, the rotor portion rotatably positioned on an outer perimeter of the stator portion and supported about the stator portion, and the stator portion rigidly supported within the booster cavity;

the rotor portion having a plurality of poles circumferentially arranged opposite the stator portion;

the stator portion having a plurality of coil portions disposed about an outer periphery of the stator portion adjacent to the rotor portion;

the stator and rotor portions being configured to generate electrical power when the rotor portion is rotated about the stator portion by the first shaft of the gas turbine engine to induce electrical currents in the coil portions.

2. The generator of claim 1, wherein the stator portion also includes an annular portion to accommodate non-electrical rotating components of the gas turbine engine within the annular portion.

3. The generator of claim 1, wherein the rotor portion and the stator portion are configured as a switched reluctance electromagnetic machine.

4. The generator of claim 1, wherein the rotor portion and the stator portion are configured as a synchronous reluctance machine.

5. The generator of claim 1, wherein the rotor portion and the stator portion are configured as an induction machine.

6. The generator of claim 1, wherein the rotor portion and the stator portion are configured as an electromagnetic machine.

7. The electrical generator of claim 1, wherein the electromagnetic machine includes a plurality of field windings for excitation of the rotor portion.

8. The electrical generator of claim 7, wherein the electromagnetic machine also includes cooling means for cooling the stator portion.

9. The generator of claim 1, wherein the rotor portion and the stator portion are configured as a permanent magnet machine.

10. An electrical generator for extraction of electrical power from a gas turbine engine comprising:

a rotor portion and a stator portion disposed within a booster cavity of the gas turbine engine, the gas turbine engine comprising a first shaft driving a low pressure turbine and a second shaft driving a high pressure turbine, the first and second shafts independently rotatable, the rotor portion rotatably positioned on an outer perimeter of the stator portion and supported about the stator portion, and the rotor portion and the stator portion arranged concentrically within the booster cavity;

the rotor portion having a plurality of poles arranged circumferentially opposite the stator portion;

the stator portion having a plurality of coil portions adjacent to the rotor portion;

the rotor portion being integrated within the annular cavity and rotatable relative to the stator portion; and the stator portion being rigidly supported within the annular cavity;

wherein the stator and rotor portions are configured to generate electrical power when one of the rotor portion and the stator portion is rotated relative to the other by the first shaft of the gas turbine engine to induce electrical currents in the coil portions.

11. The electrical generator of claim 10, wherein the generator also includes an annular portion to accommodate non-electrical rotating components of the gas turbine engine within the annular portion.

12. The electrical generator of claim 10, wherein the rotor portion and the stator portion are configured as a switched reluctance electromagnetic machine.

13. The electrical generator of claim 10, wherein the rotor portion and the stator portion are configured as a synchronous reluctance machine.

14. The electrical generator of claim 10, wherein the rotor portion and the stator portion are configured as an induction machine.

15. The electrical generator of claim 10, wherein the rotor portion and the stator portion are configured as an electromagnetic machine.

16. The electrical generator of claim 10, wherein the electromagnetic machine includes a plurality of field windings for excitation of the rotor portion.

17. The electrical generator of claim 16, wherein the electromagnetic machine also includes cooling means for cooling the stator portion.

18. The generator of claim 10, wherein the rotor portion and the stator portion are configured as a permanent magnet machine.

* * * * *